Sept. 10, 1963   O. Q. NIEHAUS   3,103,573
RESISTIVE HEATER CONTROL METHOD
Filed June 27, 1962   4 Sheets-Sheet 1

INVENTOR
OWEN Q. NIEHAUS
BY Semmes and Semmes
ATTORNEY

Sept. 10, 1963 O. Q. NIEHAUS 3,103,573
RESISTIVE HEATER CONTROL METHOD
Filed June 27, 1962 4 Sheets-Sheet 2

INVENTOR
OWEN Q. NIEHAUS
BY Semmes and Semmes
ATTORNEY

Sept. 10, 1963

O. Q. NIEHAUS 3,103,573

RESISTIVE HEATER CONTROL METHOD

Filed June 27, 1962

INVENTOR
OWEN Q. NIEHAUS
BY John Gibson Semmes
ATTORNEY

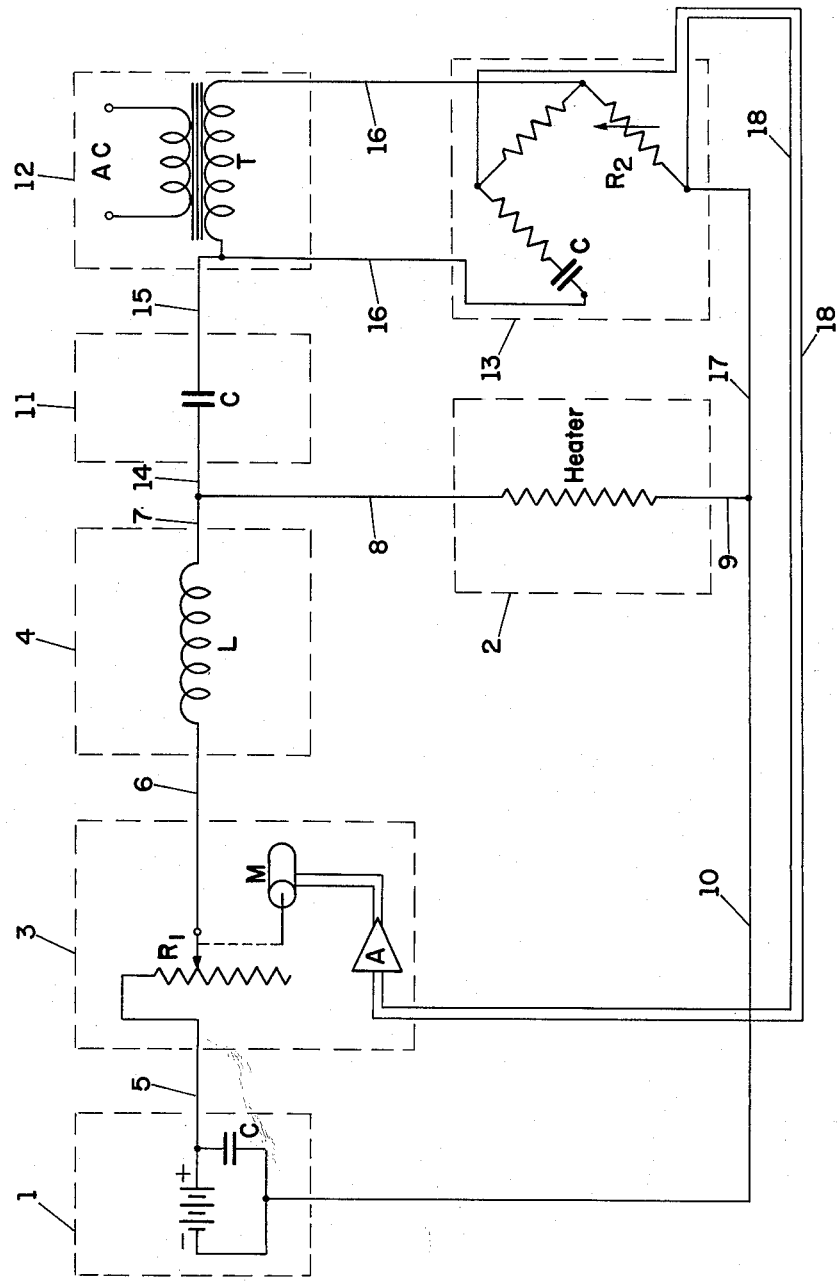

United States Patent Office 3,103,573
Patented Sept. 10, 1963

3,103,573
RESISTIVE HEATER CONTROL METHOD
Owen Q. Niehaus, Fort Worth, Tex., assignor to Bell Aerospace Corporation, Wheatfield, N.Y., a corporation of Delaware
Filed June 27, 1962, Ser. No. 205,578
7 Claims. (Cl. 219—20)

The present invention relates to a method for control of a resistive heater, particularly a method for controlling resistive heater temperatures independently of ambient temperature.

This application is a continuation-in-part of copending applications Serial Number 10,378, now abandoned, for Method for Control of Resistive Heater, filed February 23, 1960, and Serial Number 89,151, now abandoned, for Improved Method for Control of Resistive Heater, filed February 14, 1961.

The prior art teaches elaborately dependent means for measuring resistance in a heater element circuit so as to control temperatures in a mass surrounding the heater elements. The present invention is distinguished from such means in that an isolated circuit is employed to independently measure resistance in the heater element itself and without reference to the current and voltage properties of the heater circuit.

The invention accordingly consists in a method for controlling a resistive heater comprising the steps of energizing the heater, independently measuring resistance in the heater by means of an isolated circuit, and varying the energization so as to maintain substantially constant temperature in the resistance.

The present method is applicable to control of temperature in resistive heaters which have resistive properties correlated with heater temperature. Thus, resistance encountered in such a heater is measured by a separately energized and isolated circuit in terms of a preselected resistance accompanying a desired temperature in the heater. Accordingly, energization of the resistive heater circuit may be limited so as to maintain heater resistance and thus heater temperature substantially constant with respect to a preselected resistance-temperature value.

As further distinguished from the prior art, the present method of temperature control by independently measuring and controlling resistance in a heater does not imply control of electrical power. Merely controlling electrical power to a constant value does not necessarily imply controlling temperature of a resistive heater since the temperature of a resistive heater is related to rate of heat transfer between the heater and mass of material being heated and/or between the heater and its environment.

It is suggested that the present method of temperature control in a resistive heater would be applicable in thermal suture bonding devices, heating elements in electric kitchen ranges, domestic heating pads, electric blankets, space and crash helmet face plate heating and defogging devices and all other devices where it is desirable to control or regulate resistive heater temperature independently of ambient temperature.

Also, the present method is applicable to control of temperatures in resistance cooling devices such as Peltier junctions where within the cooling capability of the junction it is possible to establish and maintain temperatures below ambient temperature by independently measuring resistance in the cooling element and, accordingly, varying energization of the cooling element circuit. Also, the present method may be applied to precise temperature control in a cooling jacket (refrigerator) which contains a resistance heating element, positioned for temperature control not achievable by the properties of the refrigeration or cooling system. Such a cooling jacket might serve the purpose of dropping temperatures 60° F. below room temperature (±5° F.) and the heater might be used to control a smaller internal volume at say 40° F. below room temperature (±½° F.).

Accordingly, it is an object of invention to provide a method for controlling temperature in a resistive heater; independently of ambient temperature.

Another object of invention is to provide a method for independently measuring resistance in a resistive heater.

Another object of invention is to provide a method for independently measuring resistance in a heater and varying energization of said heater to provide substantially constant heater resistance and temperature.

Another object of invention is to provide an isolated A.C. voltage circuit for independently measuring resistance in a D.C. powered heater.

Another object of invention is to provide a method for utilizing a D.C. voltage circuit for independently measuring resistance in an A.C. powered heater.

Yet another object of invention is to provide a method for controlling temperature in a first frequency A.C. powered resistive heater by means of an isolated circuit of second frequency A.C.

Yet additional objects of invention will become apparent from the ensuing specification and attached drawings wherein:

FIG. 1 is a schematic of a D.C. powered resistive heater which is temperature-controlled by independently measuring resistance in said heater through an isolated A.C. voltage circuit and varying, accordingly, energization of said resistive heater;

FIG. 2 is a schematic of an A.C. powered resistive heater which is temperature-controlled by independently measuring resistance in said heater through an isolated D.C. voltage circuit and varying, accordingly, energization of said resistive heater; and FIG. 3 is a schematic of a resistive heater powered by an A.C. source of a first frequency and temperature-controlled by independently measuring resistance in said heater through an A.C. voltage source of a second frequency and varying, accordingly, energization of said resistive heater circuit.

FIG. 4 is a schematic of a resistive heater powered by an electrical energy source and temperature controlled by independently measuring resistance in said heater through a voltage source of same or other source as the heater electrical power source and varying, accordingly, energization of said heater circuit. According to this modification, a commutator provides time sharing of circuit elements 61, 56 and 62.

Figure 1:
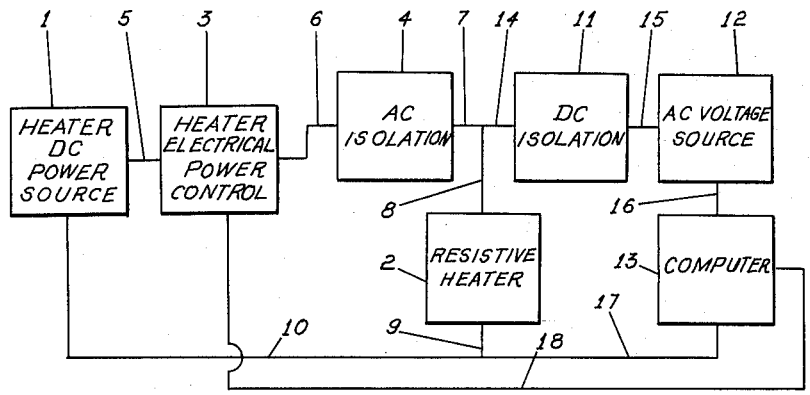
Figure 5:
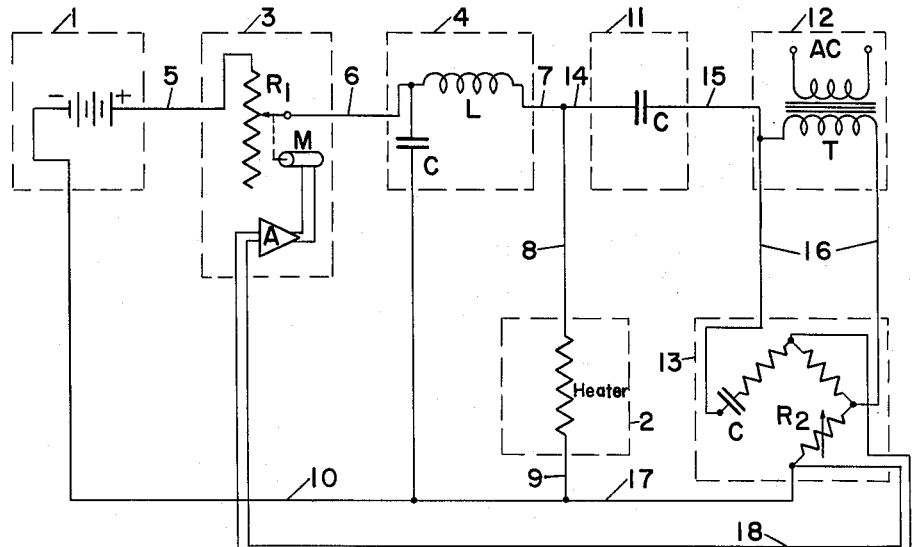
FIG. 5 is a detailed schematic of resistive heater and independent measuring circuits of FIG. 1.

FIG. 7 is a detailed schematic of the FIGS. 1 and 5 resistive heater circuit modified to the extent that the capitor is removed from the A.C. isolation means 4 and located in D.C. power source 1.

FIG. 1 illustrates the present method of controlling through an isolated constant A.C. voltage source the resistance of a D.C. energized heater. Heater power source 1 supplies D.C. power to resistive heater 2, having either a positive or negative temperature co-efficient of resistance, through a circuit comprising heater electrical power control 3 and an A.C. isolation means 4 and suitable electrical conductors 5, 6, 7, 8, 9, and 10. The resistance of heater 2 is measured independently by an isolated circuit comprised of D.C. isolation means 11, A.C. voltage source 12, computer 13 and suitable electrical conductors 14, 15, 16, 17, 8, and 9. Any difference between said heater 2 resistance and a preselected reference resistance is computed in computer 13 and thence relayed, through suitable electrical, mechanical or other means 18, to the heater electrical power control 3 which varies energization of resistive heater 2 to reduce the aforementioned resistance difference to essentially zero. Concomitantly A.C. power is blocked from the resistive heater circuit by A.C. isolation means 4. Conversely in the isolated measuring circuit isolation means 11 permits the passage of A.C. but blocks D.C. which originates at heater D.C. power source 1. FIG. 5 sets forth a typical circuit capable of performing the functions described for FIG. 1. Heater D.C. power source 1 is supplied by an electrical battery, as shown. The capacitor shown in A.C. isolation means 4 may be located alternatively in D.C. power source 1, as shown in FIG. 7. The battery voltage applied to resistive heater 2 is varied by a motor driven rheostat R1 in heater electrical power control 3. The direction of motor M rotation is controlled by amplifier A which receives its intelligence via conductors 18 from computer bridge circuit 13. In A.C. voltage source 12 power such as 60 cycle per second, 115 volts, is supplied to the terminals and is altered as required by power transformer T. The secondary of transformer T provides A.C. energization through conductors 16 to computer bridge circuit 13. The resistive heater 2 D.C. energy is blocked or isolated from computer bridge circuit 13 by condenser C in D.C. isolation means 11. A.C. energy used to energize computer bridge circuit 13 is blocked or isolated from the heater D.C. power source 1 by inductor L in A.C. isolation means 4 and capacitor C, which as described above may be located in either heater D.C. power source 1 or in A.C. isolation means 4, as shown in FIG. 5. Inductor L and capacitor C function as a low pass filter. Any difference between resistive heater 2 resistance and a preselected, controllable resistance of rheostat R2, unbalances computer bridge circuit 13. This unbalance provides driving intelligence through amplifier A to motor M in heater electrical power control 3, to alter rheostat R1, which then varies the electrical energy supplied to the resistive heater 2. This, in turn, appropriately changes the temperature and hence the resistance of resistive heater 2 to bring the latter into substantial agreement with the preselected value of resistor R2 in computer bridge circuit 13.

Figure 2:
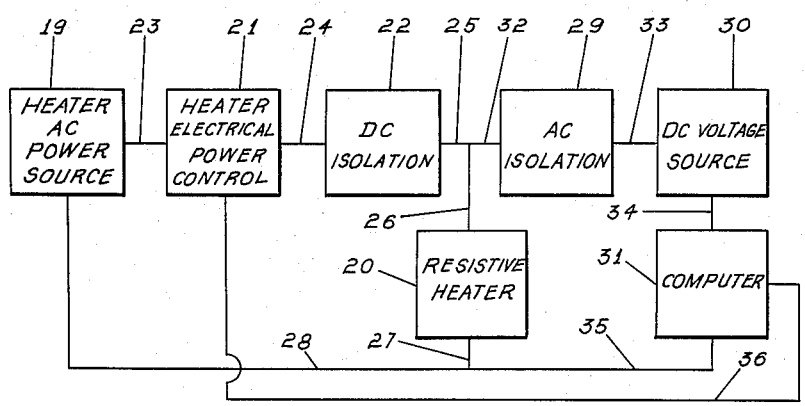

FIG. 2 illustrates a modified method of controlling A.C. energized heater 20 through the use of an isolated D.C. voltage circuit for measuring the resistance of heater 20. Heater 20 may possess either a negative or positive temperature coefficient of resistance. Heater A.C. power source 19 supplies A.C. power to resistive heater 20 through a circuit comprising heater electrical power control 21, D.C. isolation means 22 and suitable electrical conductors 23, 24, 25, 26, 27, and 28. The resistance of heater 20 is measured by an isolated circuit comprised of A.C. isolation device 29, D.C. voltage source 30, computer 31 and suitable electrical conductors 32, 33, 34, 35, 26, and 27. Any difference between the said heater 20 resistance and a preselected reference resistance is computed in computer 31 and thence relayed through suitable electrical, mechanical or other means 36, to heater electrical power control 21 in such manner as to vary energization of heater 20 and, thus, reduce the aforementioned resistance difference to essentially zero. D.C. isolation device 22 permits the passage of A.C. heater current but blocks the D.C. power supplied by the D.C. voltage source 30. A.C. isolation device 29 permits the passage of direct current, but blocks A.C. originating from the heater A.C. power source 19.

Figure 3:
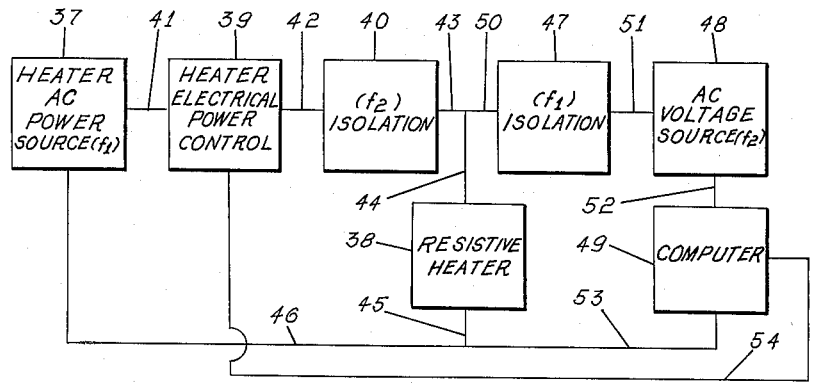

FIG. 3 illustrates a modified method for controlling an A.C. energized heater, which may be either a negative or positive temperature coefficient material, by measuring heater resistance through an isolated A.C. circuit. Heater A.C. power source 37 supplies A.C. power of a first frequency to resistive heater 38 through a circuit comprising heater electrical power control 39, a frequency dependent A.C. isolation means 40 and suitable electrical conductors 41, 42, 43, 44, 45, and 46. The resistance of heater 38 is measured by an isolated circuit comprised of frequency dependent A.C. isolation device 47, A.C. second frequency voltage source 48, computer 49 and suitable electrical conductors 50, 51, 52, 53, 44, and 45. Any difference between said heater 38 resistance and a preselected reference resistance is computed in computer 49 and thence relayed through suitable electrical, mechanical or other means 54 to the heater electrical power control 39 which, in turn varies energization of heater so as to reduce the aforementioned resistance difference to essentially zero. Frequency dependent A.C. isolation device 40 permits the passage of A.C. first frequency but blocks A.C. second frequency supplied in the isolated circuit by A.C. voltage source 48.

Figure 4:
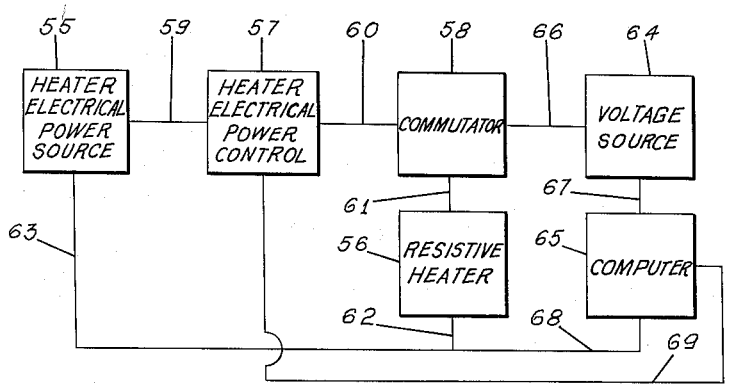
Figure 6:
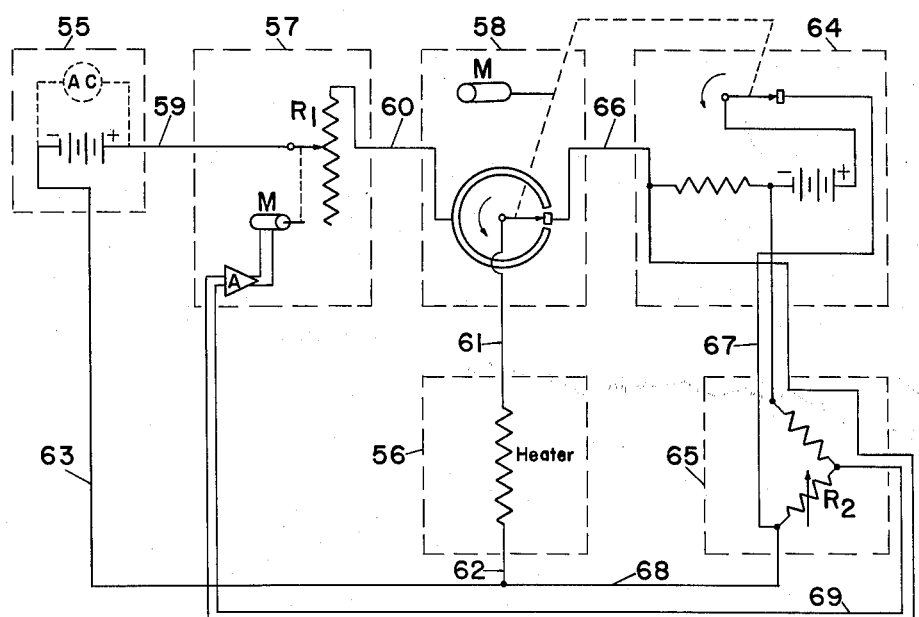
FIG. 6 is a detailed schematic of a resistive heater and independent measuring circuits of FIG. 4.

FIG. 4 illustrates a modified method of controlling an electrically energized heater 56 through the use of an isolated voltage circuit for measuring the resistance of heater 56. Heater 56 may possess either a negative or positive temperature coefficient of resistance. Heater electrical power source 55 supplies electrical power, either A.C. or D.C. to resistive heater 56 through a circuit comprising heater electrical power control 57, a commutator isolation means 58 and suitable electrical conductors 59, 60, 61, 62, and 63. The resistance of heater 56 is measured by an isolated circuit comprised of the commutator isolation means 58, a voltage source, either A.C. or D.C. 64, a computer 65 and suitable electrical conductors 61, 66, 67, 68, and 62. The commutator 58 permits time sharing of circuit elements 61, 56, and 62 between the heater energizing circuit and the heater resistance measuring circuit. Commutator 58 may be any suitable electrical or mechanical device capable of closing either the heater energization circuit or the heater resistance measuring circuit but not both simultaneously. Any difference between the said heater 56 resistance and a preselected reference resistance is computed in computer 65 when the heater resistance measuring circuit is closed and thence relayed through suitable electrical, mechanical or other means 69 to the heater electrical power control 57 and, thus, reduce the aforementioned resistance difference to essentially zero. FIG. 6 sets forth a typical circuit capable of performing functions described for FIG. 4. Heater electrical power source 55 embodies a D.C. battery. The D.C. battery may alternatively be supplanted by an A.C. power adapter shown in phantom, providing for example 60 cycles per second, 115 volts. In the former case, the battery voltage applied to resistive heater 56 is appropriately varied by heater electrical power control 57 motor M driving rheostat R1. Motor M is controlled by amplifier A which receives its intelligence via conductors 69 from computer bridge circuit 65. Commutator 58 provides electrical isolation between the heater energizing circuit shown to the left of resistive heater 56 and the heater resistance measuring circuit shown to the right of heater 56 and is comprised of a constant speed motor M, which drives a commutator wiper in a counter-clockwise direction in the circuit shown. The actual direction of rotation is immaterial to the proper functioning of the circuit. The commutator wiper alternately closes the heater energizing circuit and the heater resistance measuring circuit. The length of time the heater energizing circuit is closed can be seen to be appreciably longer than the length of time the heater resistance measuring circuit is closed. This is a design variable to be judiciously chosen to satisfy particular heater requirements. While an electro-mechanical commutator is shown it may be readily replaced with an all electronic counterpart. Heater electrical resistance is measured by a circuit energized by voltage source 64, shown as comprising a D.C. battery, which is introduced into the resistance measuring circuit by a rotary switch. The rotary switch is mechanically driven in synchronism with the closing of the heater resistance measuring circuit by the commutator 58 motor M. When inserted, voltage source 64 battery energizes computer bridge circuit 65. One leg, R2, can be preselectively controlled. Bridge unbalance arises when the resistance of heater 56 differs from the set resistance of rheostat R2. This unbalance is transmitted through conductors 69 to heater electrical power control 57 amplifier A to rotate motor M, and rheostat R1, thus varying the heater energy supplied by the heater energizing circuit which in turn varies the heater temperature and simultaneously its resistance in such manner as to bring its resistance into agreement with computer bridge circuit rheostat R2.

As will be apparent, the present method of controlling temperature in a resistive heater by independently measuring resistance in said heater and varying energization of said resistive heater so as to maintain substantially constant resistance and thus temperature in said resistive heater is applicable to temperature control of the above described devices as well as control of various other resistive heating means, indeepndently of ambient temperatures. Applicant does not intend to be limited by the individual elements illustrated and described in the suggested circuits. There are literally thousands of variations in circuitry and interchanges of elements which might be resorted to without departing from the spirit and scope of the invention, as defined by the subjoined claims.

I claim:

1. A method for control of a resistive heater having a temperature coefficient of resistance to the extent that temperature changes in the heater are reflected in measurable changes of resistance in the heater, independently of ambient temperature comprising energizing a resistive heater circuit; energizing an isolated measuring circuit; measurng resistance in said resistive heater through said isolated measuring circuit and in terms of pre-selected resistance accompanying desired temperature in said resistive heater; and varying energization of said resistive heater circuit so as to maintain said pre-selected resistance and, thus said desired, temperature in said resistive heater.

2. A method for control of resistive heater temperature independently of ambient temperature, which said resistive heater has resistive properties correlative with heater temperature to the extent that temperature changes in the heater are reflected in measurable changes of resistance; comprising energizing a resistive heater circuit; energizing a voltage isolated measuring circuit; measuring resistance in said resistive heater through said isolated measuring circuit and in terms of preselected resistance accompanying desired temperature in said resistive heater; and varying energization of said resistive heater circuit so as to maintain said pre-selected resistance and, thus said desired, temperature in said resistive heater.

3. A method for control of resistive heater temperature independently of ambient temperature as in claim 2, said energizing of said resistive heater circuit being through a D.C. power source and said energizing of said isolated measuring circuit being through an A.C. voltage source.

4. A method for control of resistive heater temperature independently of ambient temperature as in claim 2, said energizing of said isolated measuring circuit being through a D.C. voltage source.

5. A method for control of resistive heater temperature as in claim 2, wherein said energizing of said resistance heater circuit is by means of an A.C. first frequency power source and said energizing of said isolated measuring circuit is by means of an A.C. second frequency power source.

6. A method for control of resistive heater temperature as in claim 2, including time sharing electrical energy of said circuits through said resistive heater.

7. A method for control of resistive heater temperature as in claim 2, including separately commutating electrical energy of said heater and isolated measuring circuits through common portions of said circuits.

References Cited in the file of this patent
UNITED STATES PATENTS

| | | |
|---|---|---|
| 1,566,980 | Seede | Dec. 22, 1925 |
| 1,913,580 | Altshuler et al. | June 13, 1933 |
| 2,158,135 | MacFarlane | May 16, 1939 |
| 2,284,863 | Gulliksen | June 2, 1942 |
| 2,694,133 | Hack | Nov. 9, 1954 |
| 2,769,076 | Bogdan | Oct. 30, 1956 |